G. Nimmo,
Stone-Working Tool.
No. 70,459. Patented Nov. 5, 1867.
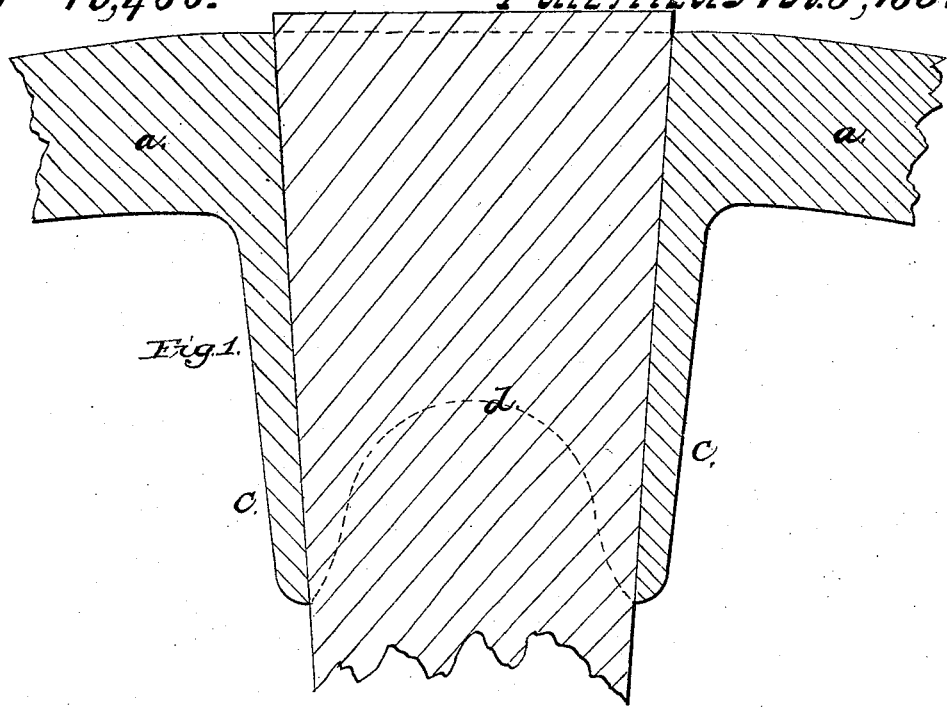
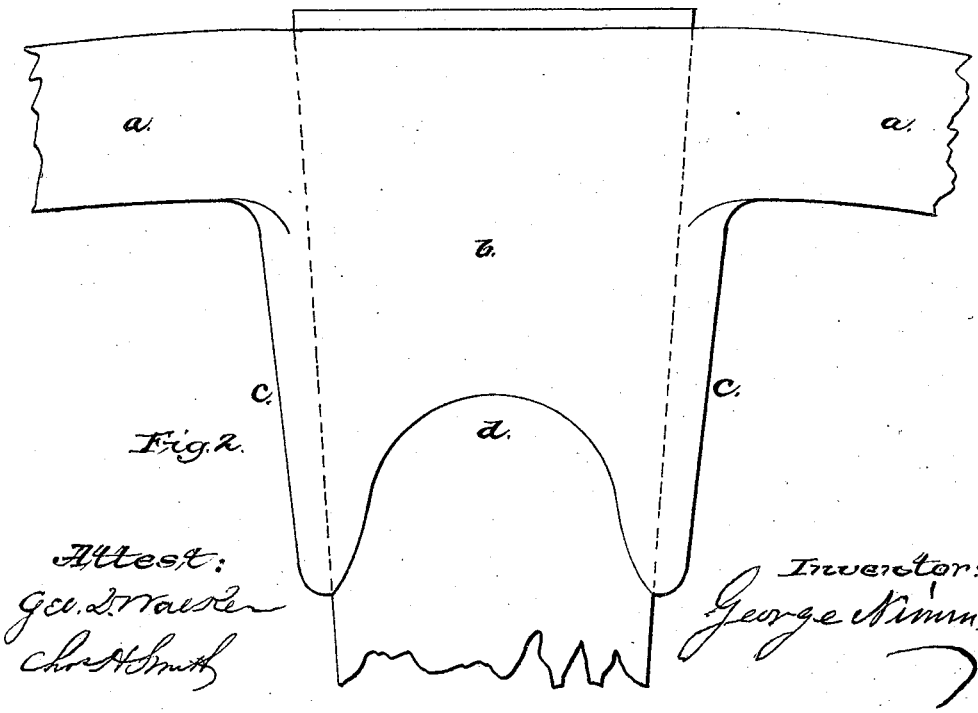
Attest: Geo. D. Walker, Chas. H. Smith
Inventor: George Nimmo

United States Patent Office.

GEORGE NIMMO, OF JERSEY CITY, NEW JERSEY.

Letters Patent No. 70,459, dated November 5, 1867.

IMPROVEMENT IN EYES FOR PICKAXES.

The Schedule referred to in these Letters Patent and making part of the same.

TO ALL WHOM IT MAY CONCERN:

Be it known that I, GEORGE NIMMO, of Jersey City, in the county of Hudson, and State of New Jersey, have invented, made, and applied to use, a certain new and useful Improvement in Eyes for Pickaxes, &c.; and I do hereby declare the following to be a full, clear, and exact description of the said invention, reference being had to the annexed drawing, making part of this specification, wherein—

Figure 1 is a section of the said eye, and

Figure 2 is a side view of the same.

Similar marks of reference denote the same parts.

Heretofore the eyes of pickaxes, hatchets, and other tools, have been made of an elliptical shape, in order that the strength of the wooden handle might be in the direction of the greatest strain, but the said eyes have generally extended only in the form of a lip at the flattened sides of the eye, hence increasing the bearing and length of the eye in a direction that effects no beneficial results, because there is but little strain on the handle the narrow way of the eye, while in the widest way of the eye the handle, generally, is not so well supported, as the pick is generally narrower at this part. In hammers, straps have been welded at the eye, running along the handle, and riveted, but these are expensive.

The nature of my said invention consists in an eye for picks, hatchets, &c., in which the metal at the top and bottom of the eye is extended so as to run along the handle where the same is the widest, so as to give a more extended bearing in the direction of the strain, and these projecting portions are tapered so that the side view of the eye appears like an arch; this gives a slight elasticity to the projections that they could not possess if the eye were formed straight on the end, and this elasticity aids in preventing the wood being strained and the metal embedded in it by the severe use to which pickaxes in particular are subjected.

In the drawing, $a$ represents the pickaxe, or a portion thereof; but my improved eye may be applied to any other implement of this general character. $b$ is the eye, formed of the usual elliptical sectional shape. $c\,c$ are projections, extending from the tool at the longest ends of the eye, and these taper so that the conformation of the handle side of the eye is an arc of a circle or nearly so, as seen at $d$.

This construction of eye prevents the handle becoming injured in use, or loose in the eye, in consequence of not being supported in the direction of the strain. The pick or tool with an eye of this character may be made of cast steel, and finished by hammering or by dies.

What I claim, and desire to secure by Letters Patent, is—

The eye for pickaxes and other tools, formed in the manner and for the purposes specified.

In witness whereof I have hereunto set my signature this eighth day of August, 1867.

GEORGE NIMMO.

Witnesses:
CHAS. H. SMITH,
GEO. D. WALKER.